Dec. 6, 1960 H. F. MARTIN 2,962,913
REVERSIBLE DRIVE MECHANISM
Filed July 22, 1959 2 Sheets-Sheet 1

INVENTOR.
HAROLD F. MARTIN
BY

Dec. 6, 1960 H. F. MARTIN 2,962,913
REVERSIBLE DRIVE MECHANISM
Filed July 22, 1959 2 Sheets-Sheet 2

INVENTOR.
HAROLD F. MARTIN
BY

United States Patent Office 2,962,913
Patented Dec. 6, 1960

2,962,913

REVERSIBLE DRIVE MECHANISM

Harold F. Martin, San Jose, Calif., assignor to International Business Machines Corporation, New York, N.Y., a corporation of New York Filed July 22, 1959, Ser. No. 828,784

12 Claims. (Cl. 74—425.5)

The present invention relates to arrangements for the transmission of power from a rotary drive element to a driven element. More particularly the present invention relates to arrangements of the type referred to which may be either disengaged so that the flow of power from the drive element to the driven element is interrupted, or may selectively be set to positions wherein the power of the drive element is transmitted to the driven element in either one of two opposite directions.

It is an object of my invention to provide a drive mechanism of the type referred to, that is of simple construction and which is easy to manipulate to set it to any of its operating positions.

More particularly it is an object of my invention to provide an arrangement for the transmission of rotary power from a drive element to a driven element, that may selectively be set to an idle position wherein it interrupts the flow of power from the drive to the driven element, and to positions wherein it imparts movement to the driven element in either of two opposite directions, with no more effort than the setting of a switch.

Another object of the invention is to provide a power transmission arrangement by means of which the continuous rotary motion of a rotary drive element is employed to impart intermittent rotary or linear motion to a driven element.

Still another object of my invention is to provide an arrangement for converting rotary motion to linear motion, that is of the simplest construction and may selectively be set by the simplest of manipulations, to idle or to advance the driven element along a linear path in either direction.

These and other objects of my invention will be apparent from the following description of the accompanying drawings which illustrate certain preferred embodiments thereof and wherein.

Figure 1:
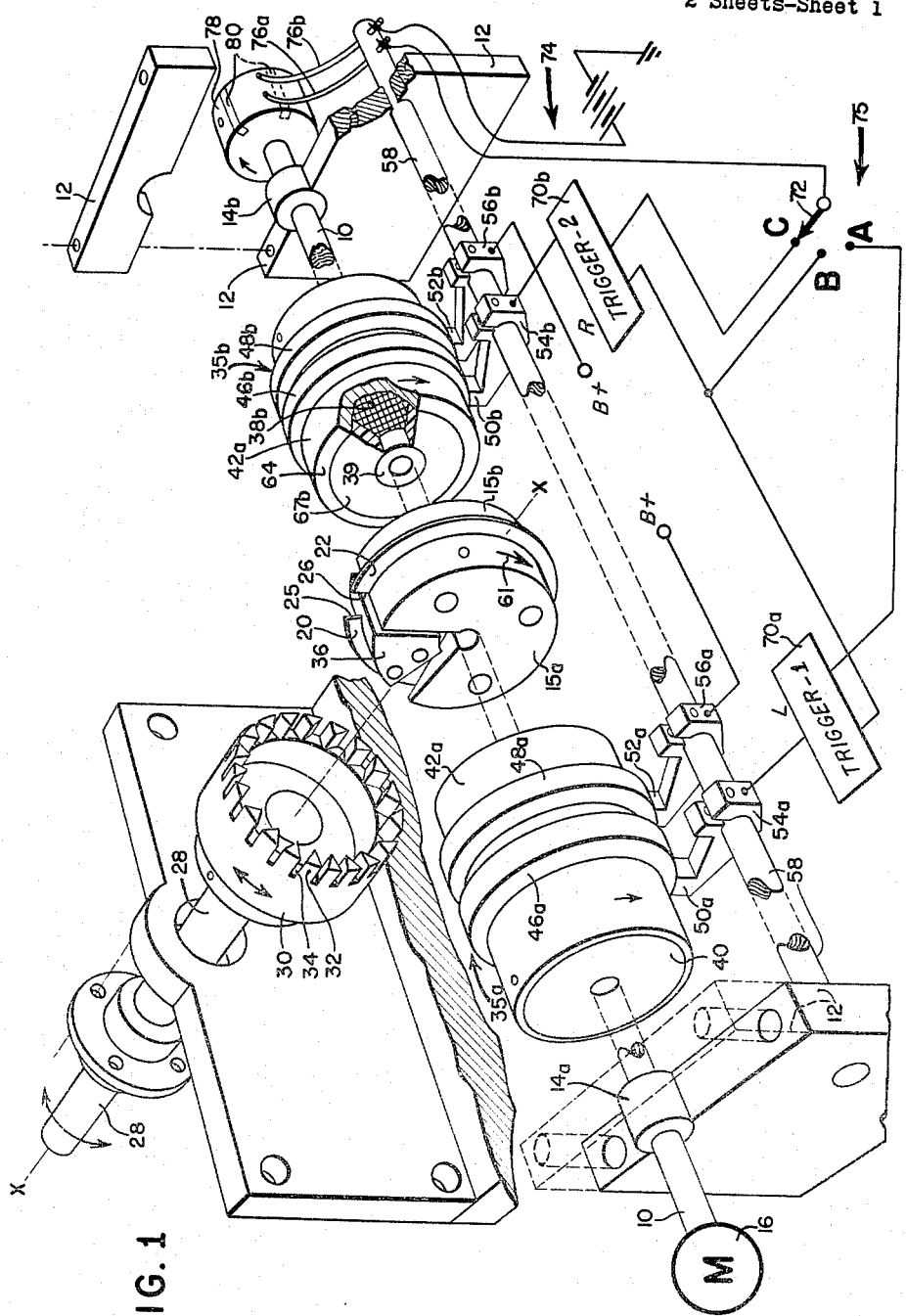
Fig. 1 is a fragmentary and partially exploded perspective of a reversible clutch arrangement embodying my invention.
Figure 2:
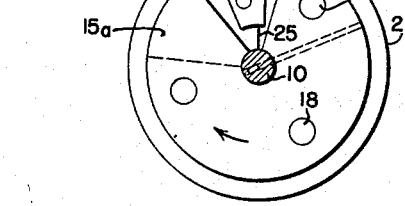
Fig. 2 is a side elevation of the drive element of the arrangement illustrated in Fig. 1.

Having first reference to Fig. 1, the reversible drive mechanism of my invention comprises a horizontally disposed rotary drive or propeller shaft 10 that is supported in a frame structure collectively identified by the reference numeral 12, by suitable bearings 14a and 14b, and which may be driven continuously by an electric motor schematically indicated at 16. Firmly mounted upon the shaft for rotation therewith are two axially spaced cylindrical plates 15a and 15b of a non-magnetic material, such as bronze, from which congruent sectors of an angular width of about 60° have been removed (Fig. 2). Held between said plates for rotation therewith such as by means of axially extending bolts 18, is a flexible circular disk 20 which may be made of a resiliently flexible material such as spring steel, and which is of a somewhat larger diametrical size than the plates 15a and 15b, so that its peripheral edge 22 projects a limited distance beyond the cylindrical surface of said plates. Along one side of the missing sectors of plates 15a and 15b, respectively, the disk 20 has a radial incision reaching from its peripheral edge toward its center as indicated at 24. Due to the flexibility of the material from which the disk is made, the radial edges 25 and 26 established by the incision 24 may be bent out of the plane of the disk as illustrated in Figs. 1, 4 and 5.

Figure 3:
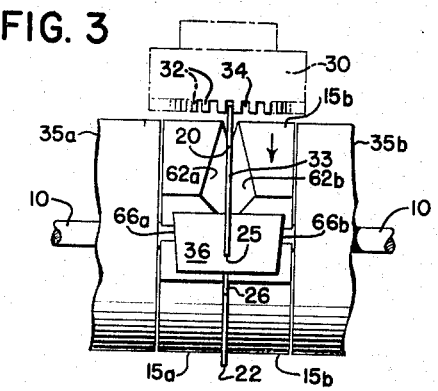
Figs. 3 and 4 are plan views of the drive element illustrating different operational positions thereof.

Mounted for rotation about a horizontal axis X—X that extends in the plane of the circular disk 20, is a shaft 28 (Fig. 1), and secured to its end at a point adjacent the peripheral edge of disk 20 is a toothed cylinder 30 which is located so close to said disk that the protruding peripheral edge 22 thereof is enmeshed with the teeth 32 of the cylinder as shown in Fig. 3. As long as the disk 20 remains in the flat position illustrated in Fig. 3, with the radial edges 25 and 26 of its incision 24 aligned in a common plane, rotation of the disk 20 with shaft 10 remains without effect upon the toothed cylinder 30. However, if the free sector 33 of the disk, i.e. the sector that is left uncovered by the cylindrical side plates 15a and 15b, is pulled out of the initial plane of the disk by a distance equal to the distance between two adjacent gaps 34 of the toothed cylinder, the peripheral edge 22 of the disk 20 is effectively converted into a single-convolution worm, and each rotation of the drive shaft 10 will then turn the toothed cylinder 30 and hence the shaft 28 upon which said cylinder is mounted, in one or the other direction depending upon the direction in which said free sector 33 is bent out of the plane of said disk.

To deflect the free sector 33 of the drive disk 20 selectively in one or the other direction, and thus render it effective to drive the toothed cylinder 30, I provide electromagnets 35a and 35b at either side of the described drive disk structure. These electromagnets will, upon energization, attract the free sector of the drive disk 20, provided said disk is made of a magnetizable material. However, to increase the attraction that said electromagnets may exert upon the free sector of the drive disk, I prefer to secure to said sector 33 a block 36 of a magnetizable material, such as soft iron, which may have the form of a cylinder sector of somewhat lesser angular width than the missing sectors of the side plates 15a and 15b, and which may extend to either side of the free disk sector 33 as best shown in Figs. 3 and 4.

Figure 4:
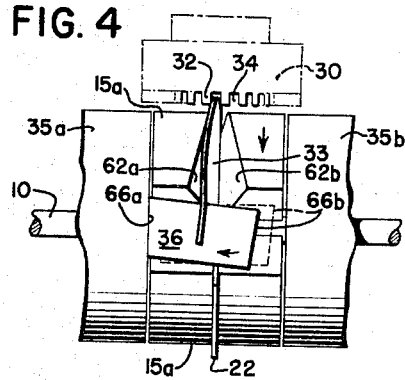
Figure 5:
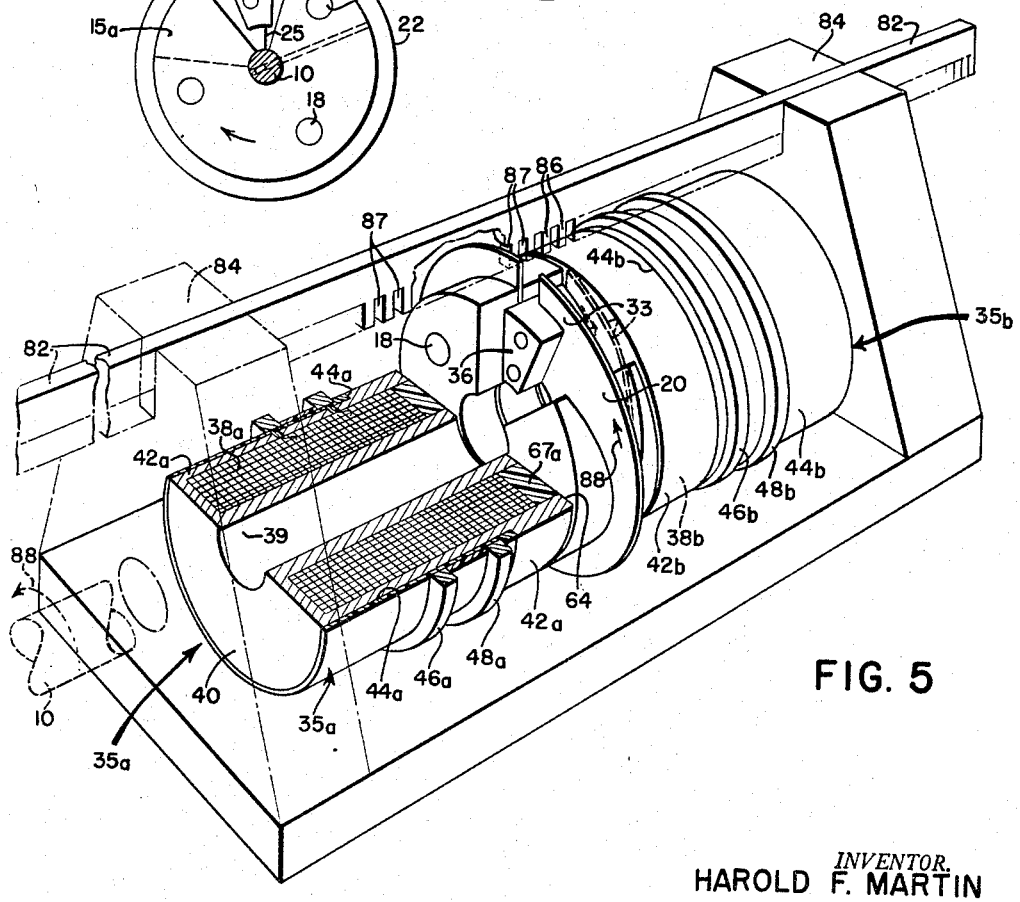
Fig. 5 is a fragmentary perspective, partly in section, of another embodiment of the invention.

Having particular reference to Figs. 1 and 4, each of the electromagnets 35a and 35b comprises a magnetizing winding 38a and 38b, respectively, that is wound upon a tubular core 39 of magnetizable material which is mounted upon the drive shaft 10 for rotation therewith. Said tubular core 39 forms part, and rises from the floor 40, of a cup 42a and 42b, respectively, of magnetizable material that surrounds each winding 38a and 38b, and which is in turn surrounded by a shell of insulating material 44a and 44b, respectively. The shells 44a and 44b carry firmly mounted thereon slide rings 46a, 48a and 46b, 48b which are connected to the opposite ends of the windings 38a and 38b, respectively. Brush contacts 50a, 52a, and 50b, 52b of an electrically conductive material, such as brass, mounted upon spring arms 54a, 56a and 54b, 56b are held in contact with the slide rings 46a, 48a and 46b, 48b, respectively, and said spring arms in turn are clamped to a shaft 58 of insulating material that extends parallel to the drive shaft 10 and is suitably supported by the frame structure 12. Whenever a direct current is passed through the winding 38a with the aid of brushes 50a and 52a, the magnetic field that strays from the open end of cup 42a acts upon the block of magnetic material 36 on the free sector 33 of the flexible drive disk and pulls it to the left as viewed in Figs. 1, 3 and 4, and if the propeller shaft 10 is in operation and turns the disk 20 in the direction of the arrow 61, said disk advances the toothed cylinder 30 with each revolution in a clockwise direction by an increment corresponding to the angular interval between the center points of two consecutive gaps 34. Vice versa, when the magnetizing winding 38b is supplied with direct current through the brushes 50b and 52b, a magnetic field strays from the open end of the cup 42b and deforms the free sector 33 of the flexible drive disk 20 in the opposite direction causing the disk to advance the toothed cylinder 30 in counterclockwise direction.

If the side plates 15a and 15b are so arranged that they hold the covered area of the drive disk 20 precisely in a vertical plane and it is therefore only the sector of said disk corresponding to the missing sectors of said side plates which can be bent out of a vertical plane, then the movement imparted by the drive disk 20 to the toothed cylinder 30 when one or the other of the electromagnets 35a and 35b is energized, is an intermittent one, i.e. for each revolution of the drive shaft 10 the drive mechanism of the invention has an active phase corresponding in length to the angular width of the free sector 33 of the disk 20, and an idle phase corresponding in length to the remaining angular width of the disk.

If it is desired to increase the active phase of the described drive mechanism as compared with its inactive phase, it is merely necessary to machine the inner surfaces of the cylindrical side plates 15a and 15b in such a manner that they diverge appropriately on the side from which the free sector of the flexible drive disk protrudes as illustrated at 62a and 62b in Figs. 3 and 4. By appropriately choosing the angle of divergence of said inner surface, the drive edge 22 of the disk may be bent out of a vertical plane along an appropriately greater arc of its periphery enabling it to impart to the toothed cylinder 30 slower, but longer lasting increments of rotary movement.

In constructing a reversible drive mechanism in accordance with my invention, care must be taken that the axial distance between the leading edge 25 and the trailing edge 26 of the worm convolution established by energization by one or the other of the electromagnets 35a and 35b be precisely equal to the distance between consecutive gaps 34 in the toothed cylinder 30 to eliminate the danger that the leading edge of the disk may strike against a tooth 32 of the driven member. For this purpose limit stops should be provided at either side of the block 36 on the free sector of the drive disk, to limit lateral deflection of said disk sector in precisely the proper position, wherein one end edge of the deformed disk may freely enter the gap between two teeth 32 of the driven member as the other edge of said disk leaves one of the directly adjacent gaps.

In the embodiments of the invention illustrated in the accompanying drawings, these limit stops are formed by the circular edges 64 (Figs. 1 and 5) of the magnetic cups 42a and 42b, which bear tightly against the outer surfaces of the side plates 15a and 15b respectively, when the drive mechanism of the invention is assembled; and the outer side surfaces 66a and 66b of the block 36 of magnetizable material on the free sector of the drive disk are preferably beveled or slanted, as best shown in Figs. 3 and 4, to lie parallel to and bear fully against the limiting end edges 64 of the magnetic cups 42a or 42b respectively, and against annular lids 67a and 67b of insulating material by which the open ends of said cups are closed (Figs. 1 and 5), whenever the free sector of the drive disk is deflected in one or the other direction.

It remains to point out that energization of the electromagnets 35a and 35b has to be carefully timed with regard to the rotary position of the deformable disk sector 33 relative to the cooperating teeth of the driven member 30; for if one of the magnets were energized, or deenergized, directly before the leading edge 35 of the drive disk entered a gap 34 in the toothed cylinder 30, said edge in the process of moving out of, or back into, the plane defined by the disk in idle position, might strike against an adjacent tooth of the cylinder 30. For this reason energization, or deenergization, of the electromagnets 35a and 35b must never occur directly before the leading edge of the drive disk enters into engagement with the driven member, but should preferably take place directly after the leading edge of the drive disk has entered into engagement with said driven member.

For this purpose the power supply to each of the magnetizing coils 35a and 35b may include an electronic trigger mechanism represented by the blocks 70a and 70b respectively (Fig. 1). Each of said trigger mechanisms is normally non-conductive, and will not permit current to flow through its correlated magnetizing windings 38a and 38b, respectively, even if a power control switch 72 may have been set to a position that is intended to close a power supply circuit through said winding. However, upon proper setting of the power supply switch 72, each of said trigger mechanisms may be fired, i.e. rendered conductive, by a current impulse delivered to it by a normally open control circuit 74 including two contact brushes 76a and 76b that bear against a rotor 78 of insulating material which is firmly mounted upon, and rotates in unison with, drive shaft 10. Said rotor contains an electrically conductive member 80 that closes the control circuit 74 briefly whenever it passes the contact brushes 76a and 76b, sending a firing impulse to the trigger mechanism to which the power control switch 72 has been set. This switch has three operational contacts identified by letters A, B and C. When the arm of the control switch 72 is set to contact A, it conditions the power supply for the left magnetizing winding 38a, but no current will flow through said winding because of the presence of the trigger mechanism 70a until the conductive member 80 in timing rotor 78 closes the control circuit 74 and thus sends a firing impulse to said trigger mechanism. By appropriately choosing the angular location of the conductive member 80 and of the contact points of the brushes 76a and 76b, relative to the position of the radial incision 24 of the drive disk, matters may be arranged in such manner that firing impulses can only be sent to either of the trigger mechanisms immediately after the leading edge of the drive disk has entered into engagement with the driven member.

When the winding 38a is to be deenergized to permit return of the deflected sector of the drive disk to its idle position, under the natural resiliency of the material from which the disk is made, and thus interrupt the transmission of power from the drive shaft 10 to the driven member 30, the operator sets the arm of the control switch 72 to contact B. This remains without effect upon the power supply for the winding 38a until contact of the brushes 76a and 76b with the conductive member 80 in rotor 78 sends a current impulse to the trigger mechanism 70a. This impulse then returns said trigger mechanism to non-conductive condition. Hence, it is impossible to deenergize the electromagnet 35a to permit the deflected sector 33 of the drive disk to return to its ineffective position until just after the leading edge of the drive disk has entered into engagement with the driven member 30.

Whenever it is desired to energize the right electromagnet 35b in order to reverse the direction of movement of the driven member, the arm of control switch 72 is set to contact C. This conditions the power supply of the right magnetizing winding 38b for operation in the same manner as previously described in connection with winding 38a, but is unable to energize the left magnetizing winding until the trigger mechanism 74b is fired by a timed current impulse which is initiated by contact of the brushes 76a and 76b with the conductive member 80 of timing rotor 78; and when the arm of switch 72 is returned to contact B in order to interrupt the transmission of power from drive shaft 10 to the driven member 30, the power supply to the right magnetizing winding 38b is not interrupted until a timed impulse initiated by contact of the conductive member 80 with the contact brushes 76a and 76b is delivered to the electronic trigger mechanism 74b. In this manner the reversible drive mechanism of my invention is protected against damage by inappropriately timed energization of the electromagnets 35a and 35b.

Electronic trigger mechanisms of the type employed to time the operation of the electromagnets 35a and 35b are well known in the art under the name of "flip-flop" circuits. They are in themselves not a part of the present invention, for which reason it is unnecessary to describe their electronic components and their circuitry in greater detail. Other methods of timing the energization of the electromagnets 35a and 35b appropriately so as to avoid damage to the drive disk and the driven member will readily occur to those skilled in the art.

The embodiment of the invention illustrated in Figure 4 differs from the embodiment of the invention illustrated in Figure 1 primarily by the fact that the magnetically deformable drive disk 20 on the drive or propeller shaft 10 is arranged to shift an elongated bar 82 that is slidably held in a suitable support 84, rather than turn a rotatable member. For this purpose the bar 82 is provided with equi-spaced teeth 86 in the manner of a rack, and when both the electromagnets 35a and 35b are deenergized, the drive disk 20 idles and passes ineffectively through a gap 87 between two adjacent teeth 86 of said bar. When the left electromagnet 35a is energized and the free sector 33 of the drive disk is deflected to the left while the drive shaft 10 rotates in the direction indicated by the arrow 88, the bar 82 is shifted to the right. On the other hand, when the right electromagnet 35b is energized and the free sector of the drive disk is deflected to the right, as illustrated in phantom lines in Figure 4, the rack bar 94 is shifted to the left. Thus, the novel drive mechanism of my invention may be employed not only to transmit rotary power from a rotary drive element to a rotatable driven element, such as the toothed cylinder 30 and the shaft 28 illustrated in Figure 1, it may also be employed to convert rotary movement to linear movement, and shift a bar selectively in either of two opposite directions along a linear path.

While I have illustrated my invention with the aid of certain preferred embodiments thereof, it will be understood that the invention is not limited to the specific constructional details shown and described by way of example, which may be departed from without departing from the scope and spirit of my invention.

I claim:

1. A drive mechanism comprising a rotary drive shaft, a driven member having a sequence of spaced teeth located adjacent said drive shaft, a disk of a resiliently yieldable material mounted upon said drive shaft for rotation therewith with its peripheral edge enmeshed with the teeth of said driven member, said disk having an incision in its periphery, and means adjacent said disk operable to bend a portion of the peripheral area of said disk on one side of said incision out of the plane initially defined by said disk, to convert the peripheral edge thereof into a single-convolution worm.

2. A drive mechanism comprising a rotary drive shaft, a driven member having a sequence of spaced teeth located adjacent said drive shaft, a disk of a resiliently yieldable material mounted upon said drive shaft for rotation therewith with its peripheral edge enmeshed with the teeth of said driven member, said disk having an incision in its periphery, and magnetic means operable to bend a portion of the peripheral area of said disk on one side of said incision out of the plane initially defined by said disk, to convert the peripheral edge thereof into a single-convolution worm.

3. A drive mechanism comprising a rotary drive shaft, a driven member having a sequence of spaced teeth located adjacent said drive shaft, a flat disk of a resiliently yieldable material mounted upon said drive shaft for rotation therewith with its peripheral edge enmeshed with the teeth of said driven member, said disk having a radial incision at a selected point of its periphery, means for holding a portion of said disk adjacent one edge of said incision in the plane initially defined by said disk, and normally disabled magnetic means capable upon being rendered effective to bend a portion of said disk adjacent the opposite edge of said incision out of the initial plane thereof, to convert the peripheral edge of said disk into a single-convolution worm.

4. A drive mechanism comprising a rotary drive shaft, a driven member having a sequence of equi-spaced teeth located adjacent said drive shaft, a flat circular disk of a resiliently yieldable material mounted upon said drive shaft for rotation therewith with its peripheral edge enmeshed with the teeth of said driven member, said disk having a radial incision at a selected point of its periphery, a block of magnetizable material secured to said disk adjacent one edge of said radial incision thereof, means for holding a portion of said disk adjacent the opposite radial edge of said incision in the plane initially defined by said disk, and normally deenergized magnetic means disposed adjacent to, yet spaced from one side of said disk, and effective upon energization to act upon said block and pull the portion of the peripheral edge of said disk to which said block is attached, out of the initial plane thereof, to convert the peripheral edge of said disk into a single-convolution worm.

5. A drive mechanism according to claim 4 including stop means for limiting the movement of said last mentioned portion of said disk in response to energization of said magnetic means to a distance equal to the interval between two teeth of said driven member.

6. A drive mechanism according to claim 4 wherein said driven member is a rotatably mounted toothed cylinder.

7. A drive mechanism according to claim 4 wherein said driven member is a rack bar mounted for longitudinal movement.

8. A reversible drive mechanism comprising a drive shaft, a driven member having a sequence of spaced teeth mounted adjacent said drive shaft, a disk of a resilient yieldable material mounted upon said drive shaft for rotation therewith with its peripheral edge enmeshed with the teeth of said driven member, said disk having a radial incision in its periphery, and means selectively operable to bend a portion of said disk adjacent one edge of said incision out of the plane initially defined by said disk in either direction, to selectively convert the peripheral edge of said disk into single-convolution worms of opposite pitches.

9. A reversible drive mechanism comprising a rotary drive shaft, a driven member having a sequence of spaced teeth, a disk of a resiliently yieldable material mounted upon said drive shaft for rotation therewith with its peripheral edge enmeshed with the teeth of said driven member, said disk having a radial incision at a selected point of its periphery, means for holding a portion of said disk adjacent one edge of said radial incision in the plane initially defined by said disk, normally deenergized electromagnets mounted at either side of said disk, and switch means selectively operable to energize either one of said electromagnets to pull a portion of the peripheral edge of said disk adjacent the opposite edge of said incision in either direction axially of the drive shaft out of said initial plane, and thus convert the peripheral edge of said disk selectively into single-convolution worms of opposite pitches.

10. A reversible drive mechanism comprising a rotary drive shaft, a driven member having a sequence of equi-spaced teeth, a disk of a resiliently yieldable material mounted upon said drive shaft for rotation therewith with its peripheral edge enmeshed with the teeth of said driven member, said disk having a radial incision at a selected point of its periphery, a block of magnetizable material secured to said disk adjacent one edge of said radial incision, means for holding a selected portion of said disk adjacent the opposite edge of said incision firmly in a predetermined plane, normally deenergized electromagnets mounted upon said drive shaft at either side of said disk in an axially spaced relation thereto, switch means selectively operable to energize either one of said electromagnets to attract said block of magnetizable material and thus pull the portion of the peripheral edge of said disk to which said block is secured in either direction axially of the drive shaft out of said initial plane, to convert the peripheral edge of said disk selectively into single-convolution worms of opposite pitches; and means including said electromagnets for limiting outward movement of the portion of the disk edge to which said block is secured to a predetermined distance equal to the interval between adjacent teeth of said driven member.

11. A drive mechanism according to claim 10 wherein said driven member is a toothed cylinder mounted for rotation about an axis perpendicular to the axis of rotation of said drive shaft.

12. A drive mechanism according to claim 10 wherein said driven member is a rack bar mounted for sliding movement in a direction parallel to the axis of said drive shaft.

References Cited in the file of this patent
UNITED STATES PATENTS 1,093,807     Sandherr _____ Apr. 21, 1914